(12) United States Patent
Ma et al.

(10) Patent No.: US 9,722,427 B2
(45) Date of Patent: Aug. 1, 2017

(54) MODULAR INVERTER SYSTEM

(71) Applicants: Mingyao Ma, Orlando, FL (US); Haibing Hu, Orlando, FL (US); Nasser Kutkut, Orlando, FL (US); Issa Batarseh, Orlando, FL (US); John Shen, Oveido, FL (US); Raed Bkayrat, Redondo Beach, CA (US)

(72) Inventors: Mingyao Ma, Orlando, FL (US); Haibing Hu, Orlando, FL (US); Nasser Kutkut, Orlando, FL (US); Issa Batarseh, Orlando, FL (US); John Shen, Oveido, FL (US); Raed Bkayrat, Redondo Beach, CA (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 171 days.

(21) Appl. No.: 13/979,474

(22) PCT Filed: Jun. 28, 2013

(86) PCT No.: PCT/US2013/048445
§ 371 (c)(1),
(2) Date: Jul. 12, 2013

(87) PCT Pub. No.: WO2014/004961
PCT Pub. Date: Jan. 3, 2014

(65) Prior Publication Data
US 2016/0190809 A1 Jun. 30, 2016

Related U.S. Application Data

(60) Provisional application No. 61/663,703, filed on Jun. 25, 2012.

(51) Int. Cl.
*H02J 3/38* (2006.01)
*H02M 7/49* (2007.01)
(Continued)

(52) U.S. Cl.
CPC ............. *H02J 3/383* (2013.01); *H02M 3/04* (2013.01); *H02M 7/44* (2013.01); *H02M 7/49* (2013.01); *Y02E 10/563* (2013.01)

(58) Field of Classification Search
CPC ............. H02M 1/007; H02M 1/077; H02M 2001/0077; Y10T 307/685
(Continued)

(56) References Cited

U.S. PATENT DOCUMENTS

| 5,373,433 A | 12/1994 | Thomas |
| 2002/0044473 A1* | 4/2002 | Toyomura ......... H01R 13/7039 363/142 |

(Continued)

*Primary Examiner* — Rexford Barnie
*Assistant Examiner* — Joseph Inge
(74) *Attorney, Agent, or Firm* — William Greener; Jonathan L. Gray; Bond, Schoeneck & King, PLLC (57) ABSTRACT

A system connected to an AC power grid having an AC phase signal includes an inverter module including a first inverter coupled to a DC voltage, actuated based on the AC phase signal. The first inverter provides a first voltage signal having predetermined harmonic components. A second inverter includes second switch elements coupled to the DC voltage and actuated by a second set of control signals phase delayed with respect to the first control signals. A transformer module has first and second primary windings coupled to the first and second inverters. The transformer module further includes a secondary winding coupled to first primary winding, the second primary winding, and the AC power grid. The secondary winding is configured to provide a secondary output voltage to the AC power grid by combining the first voltage signal and the second voltage signal (Continued)

such that the predetermined harmonic components are substantially cancelled.

25 Claims, 9 Drawing Sheets (51) Int. Cl.
*H02M 3/04* (2006.01)
*H02M 7/44* (2006.01)

(58) Field of Classification Search
USPC .......................................................... 307/77
See application file for complete search history.

(56) References Cited

U.S. PATENT DOCUMENTS

| | | | | |
|---|---|---|---|---|
| 2007/0236187 | A1* | 10/2007 | Wai | H02J 3/383 |
| | | | | 323/222 |
| 2009/0021081 | A1* | 1/2009 | Jacobson | H02M 1/42 |
| | | | | 307/77 |
| 2010/0007209 | A1* | 1/2010 | Eppler | H02J 7/345 |
| | | | | 307/36 |
| 2012/0001491 | A1* | 1/2012 | Cramer | H02J 3/383 |
| | | | | 307/82 |
| 2012/0257422 | A1* | 10/2012 | Lee | H02M 3/33523 |
| | | | | 363/21.12 |

\* cited by examiner

MODULAR INVERTER SYSTEM

CROSS-REFERENCE TO RELATED APPLICATIONS

This application claims priority under 35 U.S.C. §119(e) to U.S. Provisional Patent Application Ser. No. 61/663,703 filed on Jun. 25, 2012, the content of which is relied upon and incorporated herein by reference in its entirety.

STATEMENT OF GOVERNMENT INTEREST

This invention was made with government support under Agency Contract Number: DEEE0003176 award by the U.S. Department of Energy. The government has certain rights in the invention.

BACKGROUND OF THE INVENTION

1. Field of the Invention

The present invention relates generally to power conversion and particularly to inverter modules for use in power conversion systems.

2. Technical Background

A power conversion system typically refers to a system that converts energy obtained from a naturally occurring energy source into electricity. Examples of naturally occurring energy sources include, inter alia, oil, coal, natural gas, nuclear, hydro, wind and solar. A photovoltaic (PV) system refers to a system that employs solar panels that convert light energy into electrical energy. PV systems come in many different sizes. Small PV systems may be used to provide electrical power to small isolated devices such as lights. On the other hand, the PV system may be coupled to the electrical power grid to thereby supply the energy needs of many users.

The solar panel PV modules generate direct current (DC) power. The PV modules in a given array are typically connected in series to obtain a specified voltage. These series arrangements are often referred to in the art as "strings." Subsequently, the various PV strings are then connected in parallel in order to obtain the specified current. If the PV system is tied to the grid, the system includes an inverter system that is configured to convert the DC power into alternating current (AC) power. The term "grid" refers to a public electricity grid and therefore, a grid tied PV system provides the public electricity grid with AC power. An inverter is typically comprised of cascaded electronic switching devices such as insulated gate bipolar transistors (IGBTs). Each electronic switch in the switching network generates a pulse when it is actuated by its control system. The various pulses in the network are combined to form a stepped staircase waveform that approximates a sinusoidal waveform. One drawback to this approach is the following rule of thumb: the closer the stepped output voltage approaches a pure sinusoid, the more expensive the inverter becomes.

Figures 1A, 1B, 1C, 1D:
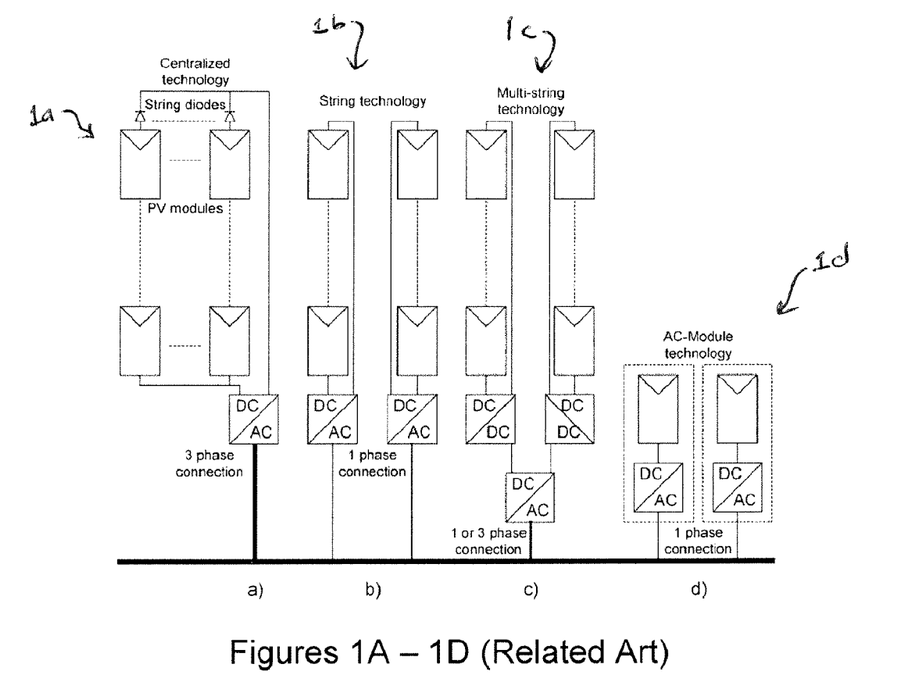
FIGS. 1(a)-1(d) are diagrammatic depictions of conventional PV inverters.

Using photovoltaic systems to provide power to the utility grid is becoming more attractive in light of the world-wide increase in the demand for power. Referring to FIGS. 1(a)-1(d), four charts provide a historical overview of conventional PV inverters. The grid tied inverter is one of the key components of a PV power conversion system, and there are essentially three types: the centralized inverter system shown in FIG. 1(a); FIG. 1 (b) illustrates string technology and FIG. 1 (c) illustrates multi-string technology; and FIG. 1 (d) illustrates AC-module and AC cell technologies. Each of these approaches has advantages and disadvantages that must be carefully considered. As such, implementations of these systems often represent a compromise of various system attributes such as harmonic rejection capability, simplicity, efficiency, flexibility, reliability, safety, modularity, and cost.

For medium power applications, the most suitable configuration is considered to be the string or multi-string technologies shown in FIGS. 1(b)-(c), where one or more strings of PV cells are connected to a single inverter. Unlike the centralized configuration, this topology offers the flexibility to optimize the number of strings and inverters for the specific application power level to increase the overall efficiency and to reduce losses. A multi-string system is a combination of several PV strings with a grid-connected inverter and is seen by many as a promising solution to the aforementioned compromises because it promises to simultaneously achieve benefits such as flexible design, ease of enlargement and high efficiency.

Figure 2:
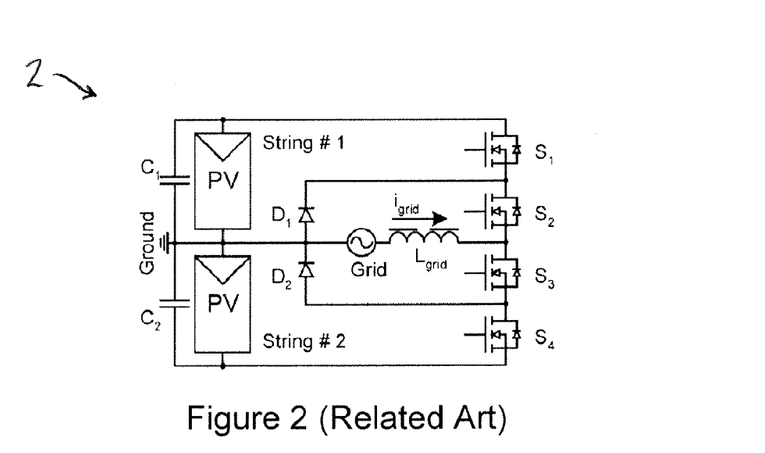
FIG. 2 is a diagrammatic depiction of a related art grid-connected inverter system.

Referring to FIG. 2, a diagrammatic depiction of a related art grid-connected inverter system 2 is shown. The inverter 2 shown in FIG. 2 is a transformerless half-bridge diode-clamped three-level inverter. Essentially, the control system turns switches $S_1$ and $S_2$ ON to provide a positive output voltage, whereas switches $S_2$ and $S_3$ are turned ON to provide a zero voltage output. Finally, when switches $S_3$ and $S_4$ are turned ON, a negative voltage is provided. The main drawback to this topology is that the first string (#1) is only loaded during positive grid voltage, whereas the second string (#2) is only loaded for negative grid voltage. Accordingly, the decoupling capacitors (C1 and C2) must be relatively large. Moreover, this topology lacks modularity because it is difficult to add additional strings to boost the voltage level because each string is loaded differently.

Figure 3:
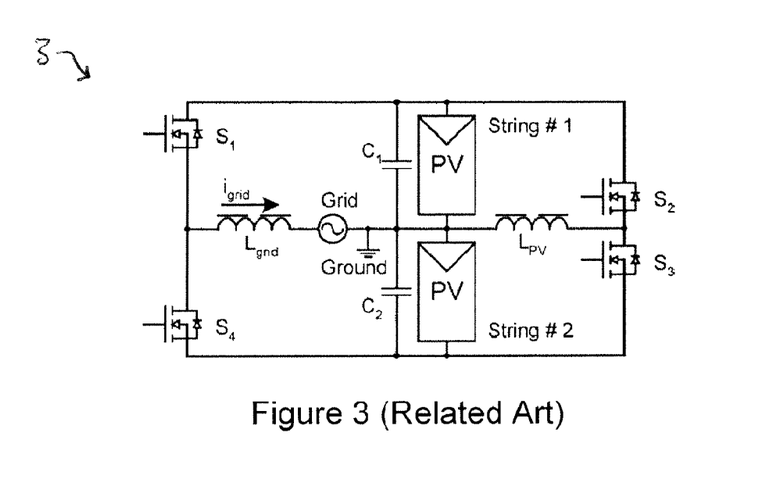
FIG. 3 is a diagrammatic depiction of another related art PV inverter.

FIG. 3 is directed to another related art photovoltaic inverter 3. Inverter 3 includes a two level voltage source inverter (VSI) that interfaces two PV strings. In comparison with the system of FIG. 2, the switching frequency of the inverter 3 must be doubled in order to use a grid inductor of the same or similar size because it can only produce a two-level output voltage. The advantages are that an individual maximum peak power tracker (MPPT) can be applied to each string and further enlargement is easily achieved by adding another PV string plus a transistor, a capacitor, and an inductor. The drawback of this topology is its buck characteristic; that is the minimum input voltage always must be larger than the maximum grid voltage.

Figure 4:
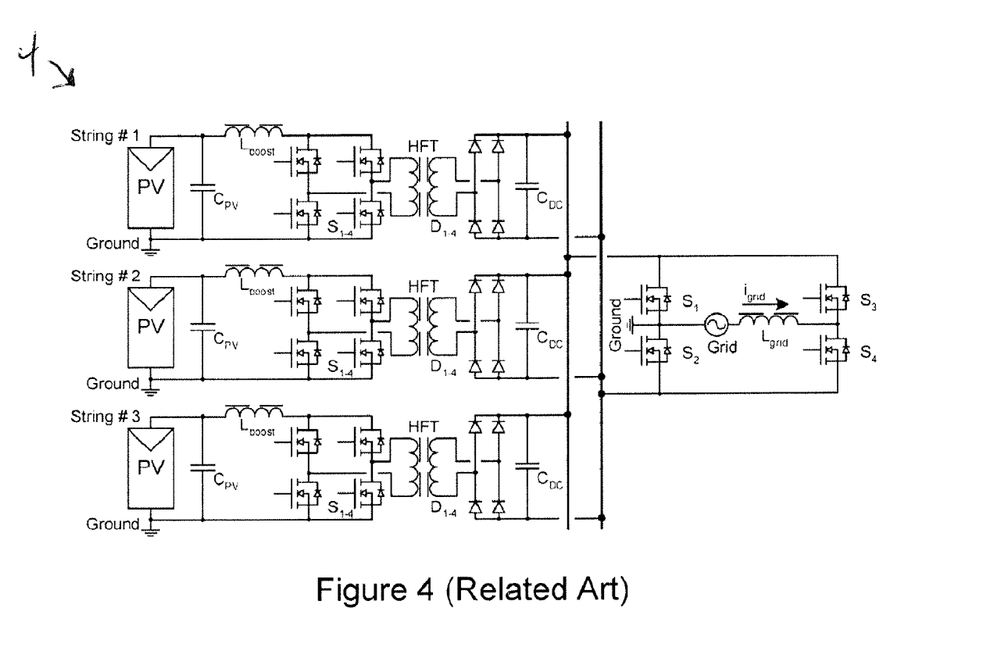
FIG. 4 is a diagrammatic depiction of a related art three-string inverter.

In reference to FIG. 4, a diagrammatic depiction of a conventional three-string inverter 4 is shown. In this related art inverter, the dc-dc converters are based on current-source full-bridge inverters with an embedded HF transformer and bridge rectifier. The PV strings are easily connected to the system ground and should allow the system to be enlarged. However, in practice, it is difficult to increase the power rate since the configuration of the grid interface inverter is fixed and effectively constrains system expansion.

What is needed is an inverter system that provides a modular solution with improved power efficiency. An inverter system that adopts the "plug and play" concept is also needed. In other words, system designers would welcome and appreciate a system that easily accommodates additional PV strings and inverter modules to increase the power rate. In fact, such a system provides the designer with the freedom to tailor the system to any user specification, whether its power requirements are large or small. A system that optimizes both design flexibility and simplicity by providing.

SUMMARY OF THE INVENTION

The present invention addresses the needs described above and is directed to a modular multi-pulse inverter that can be used in a distributed PV system, and that is configured to be tied to a utility power grid. The present invention features improved power efficiency because it operates at the line frequency at a relatively low cost for medium and high power applications. The present invention also features a modular solution that adopts the "plug and play" concept since the system of the present invention easily accommodates additional PV strings and inverter modules when an increase in the power rate is desired. In fact, the present invention provides the designer with the freedom to tailor the system to any user specification, whether its power requirements are large or small. This freedom goes a long way toward optimizing both design flexibility and simplicity.

One aspect of the present invention is directed to a system configured to be connected to an AC power grid having at least one AC phase signal. The system includes at least one inverter module comprising a first inverter having a plurality of first switch elements coupled to a direct current (DC) voltage and actuated in accordance with a first set of control signals based on the at least one AC phase signal. The first inverter provides a first voltage signal having predetermined harmonic components. The at least one inverter module further comprises a second inverter including a plurality of second switch elements coupled to the DC voltage and actuated in accordance with a second set of control signals phase delayed with respect to the first set of control signals. The second switching inverter providing a second voltage signal having the predetermined harmonic components. At least one transformer module includes at least one first primary winding coupled to the first inverter and at least one second primary winding coupled to the second inverter. The transformer module further includes at least one secondary winding coupled to the at least one first primary winding, the at least one second primary winding and the AC power grid for each at least one AC phase signal. The secondary winding is configured to provide a secondary output voltage to the AC power grid by combining the first voltage signal and the second voltage signal such that the predetermined harmonic components are substantially cancelled.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION

Reference will now be made in detail to the present exemplary embodiments of the invention, examples of which are illustrated in the accompanying drawings. Wherever possible, the same reference numbers will be used throughout the drawings to refer to the same or like parts. An exemplary embodiment of the inverter of the present invention is shown in FIG. 5, and is designated generally throughout by reference numeral 10.

Figure 5:
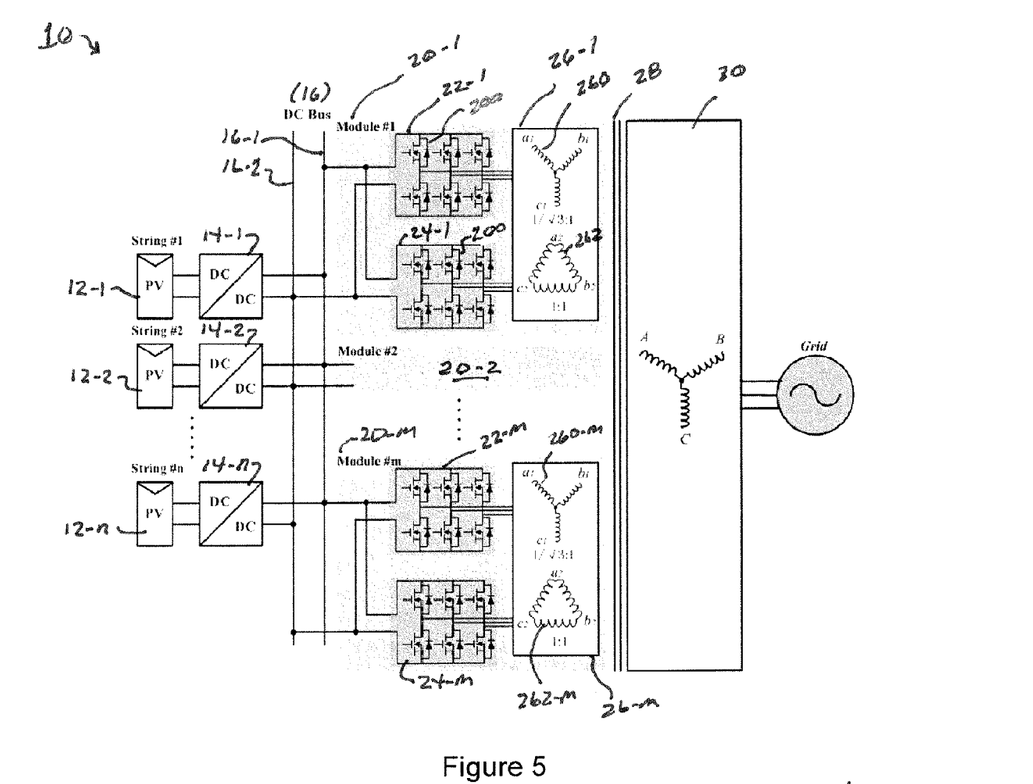
FIG. 5 is a diagrammatic depiction of the topology of a modular grid-tied multipulse inverter in accordance with one embodiment of the present invention.

As embodied herein and depicted in FIG. 5, a diagrammatic depiction of the topology of a modular grid-tied multipulse inverter system 10 in accordance with one embodiment of the present invention is disclosed. The system 10 may be coupled to n photovoltaic (PV) strings (12-1 . . . 12-n), where n is an integer value. Each PV string 12 is coupled in series with a DC/DC converter 14. Thus, the system includes n DC/DC converters (14-1 . . . 14-n). Each DC/DC converter is connected to the DC bus 16 which includes a positive DC voltage rail 16-1 and a negative DC voltage rail 16-2. The DC/DC converter 14 converts the DC voltage provided by its corresponding PV string 12 to the DC voltage required by the DC bus 16. The DC bus voltage is proportional to the number of PV strings 12 in the modular system. This, in turn, impacts the voltage rating of the switching elements 200 disposed in the voltage source inverter modules 20. When the DC bus voltage is relatively high, the power rating of the switches 200 must be selected accordingly. Of course, the power rating of the switches 200 must be somewhat higher than the DC bus 16 voltage.

The modular inverter system 10 includes M identical 12-pulse voltage source inverter modules 20 (where M is also an integer value) coupled to the DC bus 16. In particular, the module 20 includes an upper switch portion 22-1 and a lower switch portion 24-1. Each switching portion (22-1, 24-1) includes six (6) switches 200.

As those skilled in the art will appreciate, the switches 200 may be implemented using any suitable electronic switching device such as N-channel MOSFET switches, P-channel MOSFET switches, IGBT (Insulated Gate Bipolar Transistor) switches, etc. Of course, the present invention should not be construed as being limited to the switches listed above. Each of the twelve switches is actuated separately to provide the waveforms that correspond to the equations (2-9) provided herein. A detailed view of the switching module 20 and the switch timing diagrams are described in greater detail in regard to FIGS. 10A-10B.

As described in greater detail below, each switching module 20 is coupled to the grid via a line-frequency transformer (26, 28, and 30). In particular, the upper switches 22 are coupled to the grid via and Y-Y transformer and the lower switches 24 are coupled to the grid via and Δ-Y transformer.

The inverter modules 20-2 . . . 20-m are substantially identical to the first module 20-1. One purpose for providing more than one inverter module relates to the quality of the waveform synthesized by the secondary transformer 30. Compare, e.g., FIG. 7A with FIG. 13A (as further described in detail below). In comparison with FIG. 7A, the stepwise waveform of FIG. 13A more conforms to a sinusoidal waveform. In particular, a fixed phase shift is provided between each module 20 to achieve a multipulse current output at transformer's secondary side, which has relatively low harmonic distortions compared to the traditional three-phase-leg PWM inverter. The phase-shift angle can be calculated by equation (1), where the variable m denotes the number of adopted modules.

$$\theta_{phase\_shift} = \frac{360°}{12m}, m \geq 2 \quad (1)$$

Figure 6:
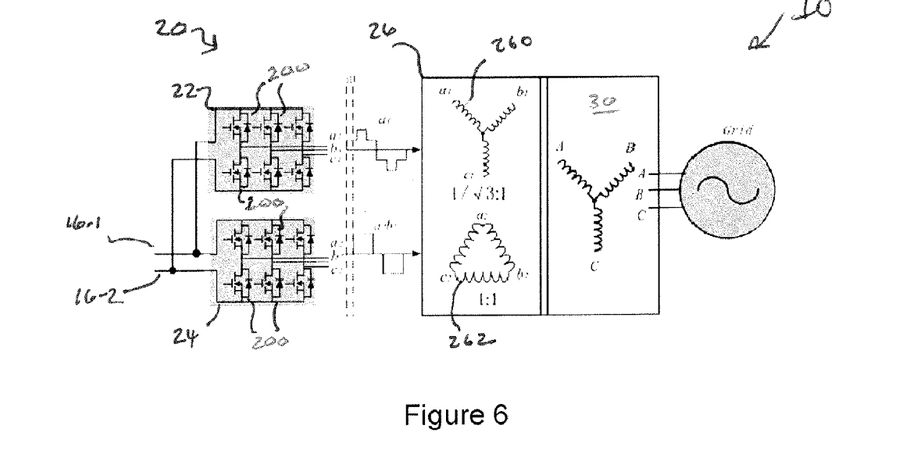
FIG. 6 is a block diagram of an inverter module depicted in FIG. 5.

Referring to FIG. 6, a block diagram of a single inverter module 20 of modular grid-tied multipulse inverter system 10 is disclosed. In this view, the PV strings 12 and the DC/DC converters 14 are not shown for clarity of illustration. The inverter module 20 includes two six-pulse inverters (22, 24) that are connected through Y-Y and Δ-Y isolation transformers, respectively. The bottom switch portion 24 has a π/6 phase delay with respect to the upper switch portion 22. In this embodiment, the transformer ratio of 1/√3:1 is set for the star-connected unit (Y-Y) and a transformer ratio of 1:1 for the delta-connected unit (Δ-Y). Both switch portions operate at the line frequency (e.g., 60 Hz) such that the normalized output voltages on transformer's primary side can be obtained by the following equations:

$$u_{a1o}(t) = \frac{2\sqrt{3}\,U_{dc}}{\pi}\Big(\sin\omega t + \frac{1}{5}\sin5\omega t + \frac{1}{7}\sin7\omega t + \frac{1}{11}\sin11\omega t + \frac{1}{13}\sin13\omega t + \dots\Big) \quad (2)$$

$$u_{a2b2}(t) = \frac{2\sqrt{3}\,U_{dc}}{\pi}\Big(\sin\omega t - \frac{1}{5}\sin5\omega t - \frac{1}{7}\sin7\omega t + \frac{1}{11}\sin11\omega t + \frac{1}{13}\sin13\omega t + \dots\Big) \quad (3)$$

These equations indicate that the $5^{th}$ and $7^{th}$ harmonic components will cancel at the output voltage of transformer's secondary side.

Referring back to FIG. 5, a system 10 that includes two modules (20-1, 20-2) will exhibit a synthesized output voltage at the transformer's secondary side as follows:

$$u(t) = \quad (4)$$
$$\frac{4\sqrt{3}\,U_{dc}}{\pi}\Big\{\sin\omega t + \sin\!\Big(\omega t - \frac{\pi}{12}\Big) + \frac{1}{11}\Big(\sin11\omega t + \sin\!\Big(11\omega t - \frac{11\pi}{12}\Big)\Big) +$$
$$\frac{1}{13}\Big(\sin13\omega t + \sin\!\Big(13\omega t - \frac{13\pi}{12}\Big)\Big) +$$
$$\frac{1}{23}\Big(\sin23\omega t + \sin\!\Big(23\omega t + \frac{\pi}{12}\Big)\Big) +$$
$$\frac{1}{25}\Big(\sin25\omega t + \sin\!\Big(25\omega t - \frac{\pi}{12}\Big)\Big) + \dots\Big\}$$

For a three module system (i.e., m=3), the synthesized output voltage at the transformer's secondary side can be expressed as:

$$u(t) = \frac{4\sqrt{3}\,U_{dc}}{\pi}\Big\{\sin\omega t + \sin\!\Big(\omega t - \frac{\pi}{18}\Big) + \sin\!\Big(\omega t - \frac{\pi}{9}\Big) + \quad (5)$$
$$\frac{1}{11}\Big(\sin11\omega t + \sin\!\Big(11\omega t - \frac{11\pi}{18}\Big) + \sin\!\Big(11\omega t - \frac{11\pi}{9}\Big)\Big) +$$
$$\frac{1}{13}\Big(\sin13\omega t + \sin\!\Big(13\omega t - \frac{13\pi}{8}\Big) + \sin\!\Big(13\omega t - \frac{13\pi}{9}\Big)\Big) +$$
$$\frac{1}{23}\Big(\sin23\omega t + \sin\!\Big(23\omega t - \frac{23\pi}{8}\Big) + \sin\!\Big(23\omega t - \frac{5\pi}{9}\Big)\Big) +$$
$$\frac{1}{25}\Big(\sin25\omega t + \sin\!\Big(25\omega t - \frac{25\pi}{18}\Big) + \sin\!\Big(25\omega t - \frac{7\pi}{9}\Big)\Big) + \dots\Big\}$$

Based on above calculations, we can easily get the normalized magnitudes of the $11^{th}$, $13^{th}$, $23^{rd}$ and $25^{th}$ harmonics when different numbers of modules are adopted, respectively. That means we can choose the number of modules flexibly according to injected current harmonic requirements.

Figure 7A:
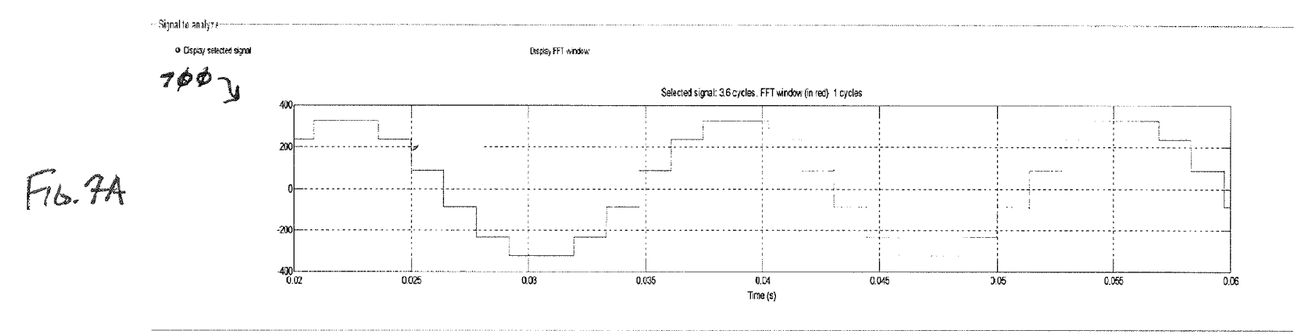
FIG. 7A-7B are plots showing the output voltage and the harmonic spectrum of the output voltage, respectively, at the transformer secondary side in the one module embodiment shown in FIGS. 6, and 8-11.
Figure 7B:
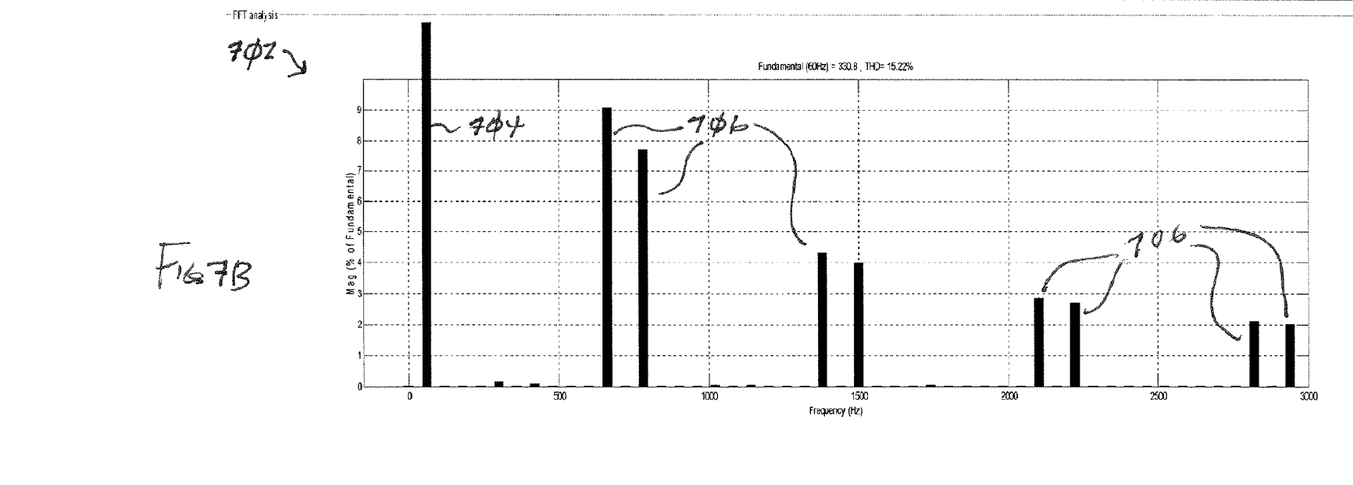

Referring to FIGS. 7A-7B, plots showing the output voltage (FIG. 7A) and the harmonic spectrum of the output voltage (FIG. 7B), respectively, at the transformer secondary side in the one module embodiment shown in FIG. 6 is disclosed. FIG. 7A shows the output voltage on the secondary windings 30 of the transformer. The output voltage of FIG. 7A, of course, synthesizes the primary side voltages represented by equations 2 and 3. As shown in FIG. 7B, the 5th and 7th harmonic components are canceled at the transformer's secondary side. The spectral tone 704 representing the line frequency and the remaining harmonic components 706 are depicted in the spectral plot of FIG. 7B.

Figure 8:
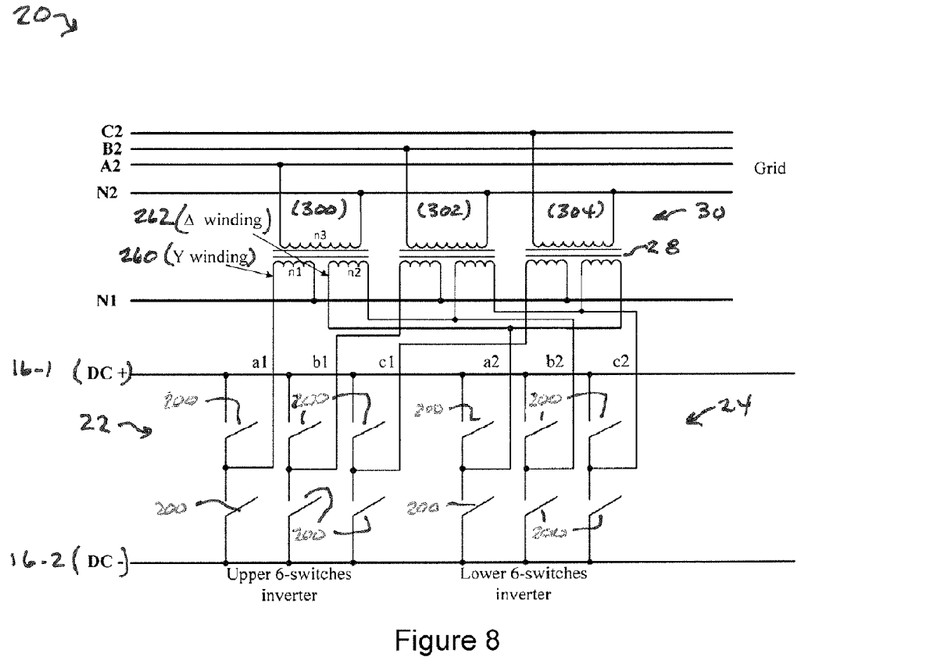
FIG. 8 is a schematic representation of the inverter module depicted in FIG. 6 illustrating the transformer windings in accordance with one embodiment of the present invention.

Referring to FIG. 8, a schematic representation of the inverter module depicted in FIG. 6 is disclosed. The solid state switches 200 are represented schematically as six pairs of single pole double throw (SPDT) switches. The positive rail 16-1 of the DC bus is connected to the collectors of the top row of switches 200 disposed in the upper switch portion 22 and the lower switch portion 24. The negative rail of the DC bus 16-2 is connected to the emitters of the bottom row of switches 200 disposed in the upper switch portion 22 and the lower switch portion 24. The emitter/collector junctions for each switch pair are connected such that the upper switches are connected to the appropriate phase legs of the Y-Y transformer and the lower switches are connected to the appropriate phase legs of the Δ-Y transformer.

With respect to the transformer windings, on the transformer's primary side, the Y type winding and Delta type winding for each phase leg (a, b, or c) share one transformer core and synthesize a multi-step output in the secondary side. The phase shift between the upper and lower inverters is 30 degrees (π/6). In other words, the phase shift of leg a2 relative to leg a1 is 30 degrees. Assuming that the turns of the Y type winding and delta type winding in the primary side are n1 and n2 respectively, and that the turns of the Y type winding in the secondary side equals n3, the transfer ratio n1:n2:n3=1/√3:1:2.

Figure 9:
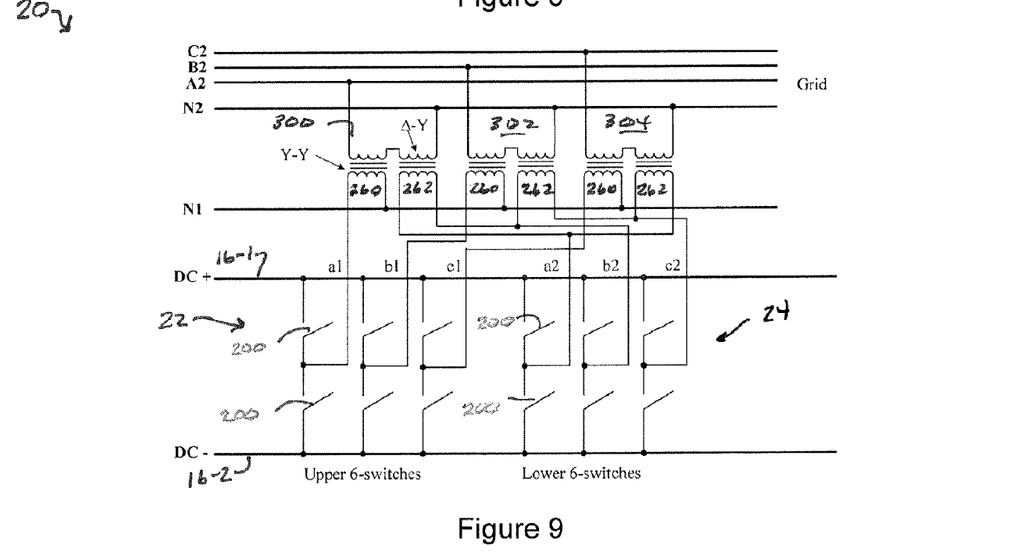
FIG. 9 is a schematic representation of the inverter module depicted in FIG. 6 illustrating the transformer windings in accordance with another embodiment of the present invention.

Referring to FIG. 9, another schematic representation of the inverter module depicted in FIG. 6 is disclosed. The switch portions 22, 24 are identical to those depicted in FIGS. 5, 6 and 8. FIG. 9 provides another inherent way that the transformers depicted in FIGS. 5 and 6 can be implemented; the embodiments of FIGS. 8 and 9 are functionally the same. The difference between the two embodiments relates to the use of a separate core for the Y-Y transformer and the Δ-Y transformer. In other words, two separate transformers are employed for each phase; one transformer provides a Y-Y connection with turns ratios 1/√3:1, while the other transformer provides a Δ-Y connection with turns ratios 1:1. The turns of two transformers on the secondary sides are the same. Moreover, the two transformers on the secondary side are wired in series.

Figure 10A:
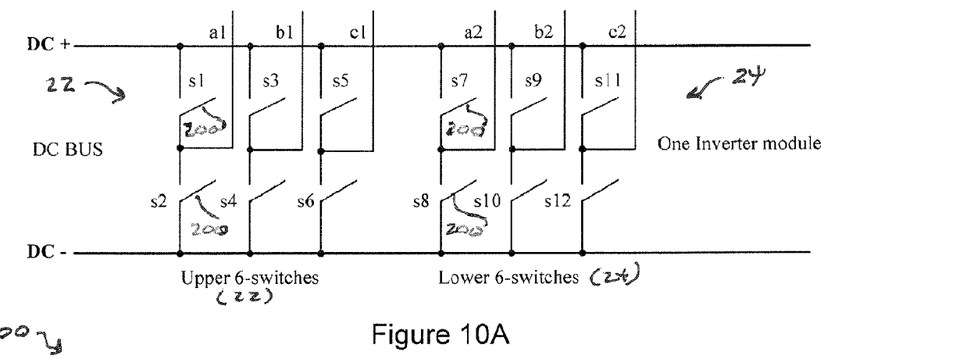
FIG. 10A is a detail schematic representation of the switches employed in the inverter module depicted in FIG. 6.
Figure 10B:
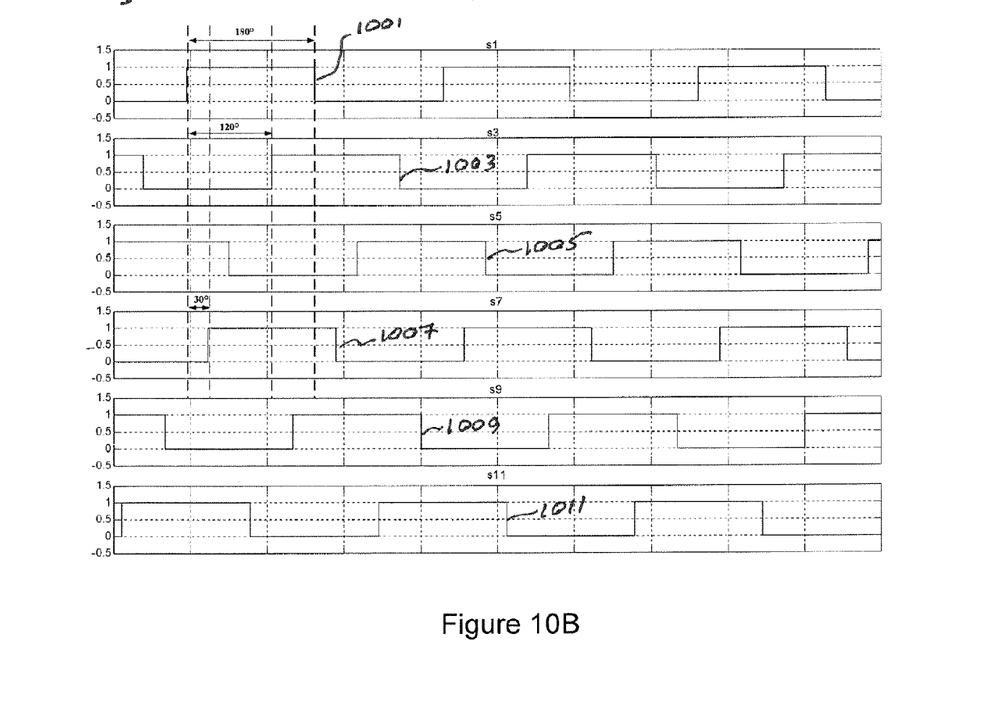
FIG. 10B are timing diagrams of the switches depicted in FIG. 6 and FIG. 10A.

Referring to FIG. 10A, a detail schematic representation of the switches employed in the inverter module depicted in FIG. 6 is disclosed. The schematic view shown here is the same as that depicted in FIGS. 5, 6, 8 and 9. As described in detail above, each module includes two switch portions (22, 24) that include six switches. In FIG. 10A, the switches 200 are renumbered as switches S1-S12 in order to more fully understand what each switch contributes to the output waveform. FIG. 10B only provides the timing diagrams for the odd-numbered switches S1-S11 because the switch in the upper row is 180° out of phase with respect to the switch in the lower row of each phase leg. Thus, FIG. 10B need only show the odd switch output signals in order to describe the switch signals required to implement equations 2 and 3 provided above.

As shown in FIG. 10B, each switch is turned ON for half of a period (180 degrees) by applying the appropriate voltage to its gate. The switches are turned OFF for the other half of the period. As noted previously, the switching frequency equals to line frequency (e.g., 60 Hz). Thus, there is a 120° phase shift between S1, S3 and S5. As mentioned above, there is a 30° phase shift between the two switch portions 22, 24. Thus, there is a 30° phase shift between S1 and S7, S3 and S9 and S5 and S 11. As noted above, S1, S3, S5, S7, S9, and S11 are 180° out of phase with respect to S2, S4, S6, S8, S10, and S12, respectively. Based on this information, the waveforms at the primaries of the Y-Y and Δ-Y transformers can be easily shown.

Figure 11A:
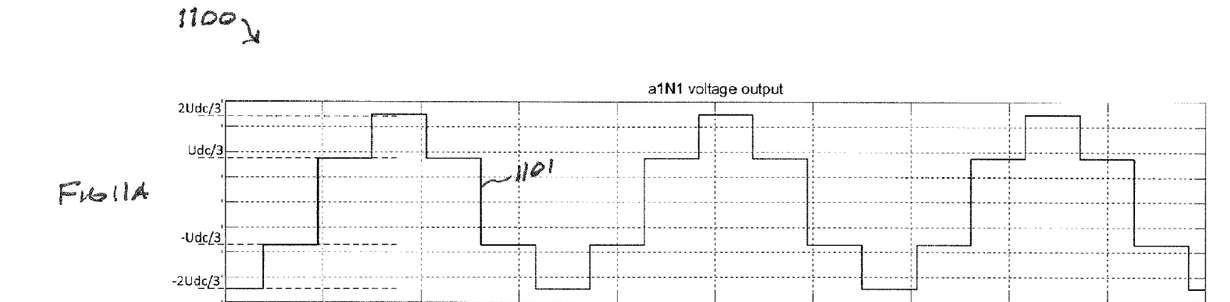
FIG. 11A is a timing diagram illustrating the phase output voltage of the upper six-switch inverter depicted in FIGS. 6 and 10A.
Figure 11B:
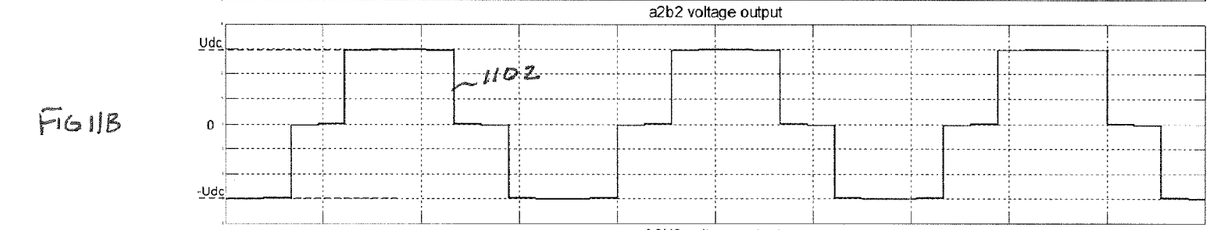
FIG. 11B is a timing diagram illustrating the phase output voltage of the lower six-switch inverter depicted in FIGS. 6 and 10A.
Figure 11C:
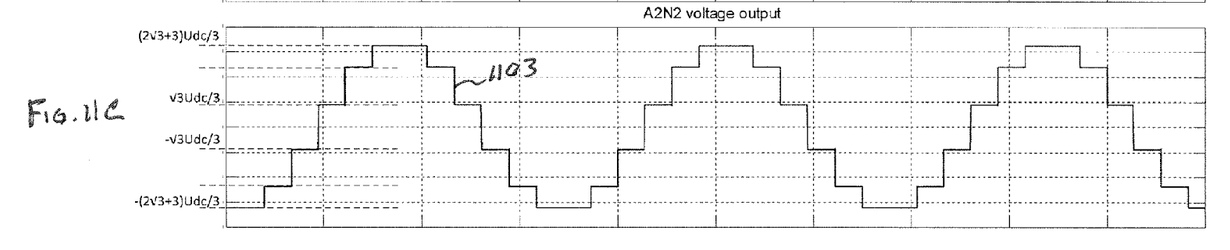
FIG. 11C is a timing diagram illustrating the output voltage at the transformer secondary side in a one module embodiment of the present invention.

Referring to FIGS. 11A-11C, timing diagrams illustrating the primary and secondary voltages of the one module system depicted in FIGS. 6, 8 and 9 are shown. FIG. 11A shows the phase output voltage of the upper six-switch inverter 22 and FIG. 11B shows the phase output voltage of the lower six-switch inverter 24. Based on FIG. 8, the upper inverter's phase voltage output can be denoted as a1N1, the lower inverter's phase voltage output can be denoted as a2b2. Accordingly, the real phase output voltages on the primary side can be represented as:

$$u_{a1N1}(t) = \frac{2U_{dc}}{\pi}\left(\sin\omega t + \frac{1}{5}\sin 5\omega t + \frac{1}{7}\sin 7\omega t + \frac{1}{11}\sin 11\omega t + \frac{1}{13}\sin 13\omega t + \ldots \right) \quad (6)$$

$$u_{a2b2}(t) = \frac{2\sqrt{3}\,U_{dc}}{\pi}\left(\sin\omega t - \frac{1}{5}\sin 5\omega t - \frac{1}{7}\sin 7\omega t + \frac{1}{11}\sin 11\omega t + \frac{1}{13}\sin 13\omega t + \ldots \right) \quad (7)$$

Note that coefficient in equation 6 is modified relative to equation 2 because of the turns ratio. Moreover, when one considers the transformer turns ratios (1/√3:1:2) described above, the synthesized output voltage $u_{A2N2}$ at the transformer's secondary's side can be expressed as equation (8) or its equivalent, equation (9):

$$u_{A2N2}(t) = \frac{1}{2}\left(\frac{n3}{n1}u_{a1N1} + \frac{n3}{n2}u_{a2b2}\right) = \left(\sqrt{3}\,u_{a1N1} + u_{a2b2}\right) \quad (8)$$

$$= \frac{4\sqrt{3}\,U_{dc}}{\pi}\left(\sin\omega t + \frac{1}{11}\sin 11\omega t + \frac{1}{13}\sin 13\omega t + \ldots \right) \quad (9)$$

Similarly, the other phase legs have similar waveforms: $u_{b1N1}$ has the same waveform with $u_{a1N1}$, only 120 degree phase delay between them, while the same relationship exists between phases $u_{b2c2}$ and $u_{a2b2}$. So the waveform of the secondary $u_{B2N2}$ is the same with output voltage $u_{A2N2}$, with a 120° between them.

To be clear, the top waveform of FIG. 11A corresponds to equation 6, and the FIG. 11B corresponds to equation 7. The only difference between equations 2 and 6 is the coefficients. The waveform of FIG. 11C is related to equation (9), and is identical to the waveform of FIG. 7A.

Figure 12A:
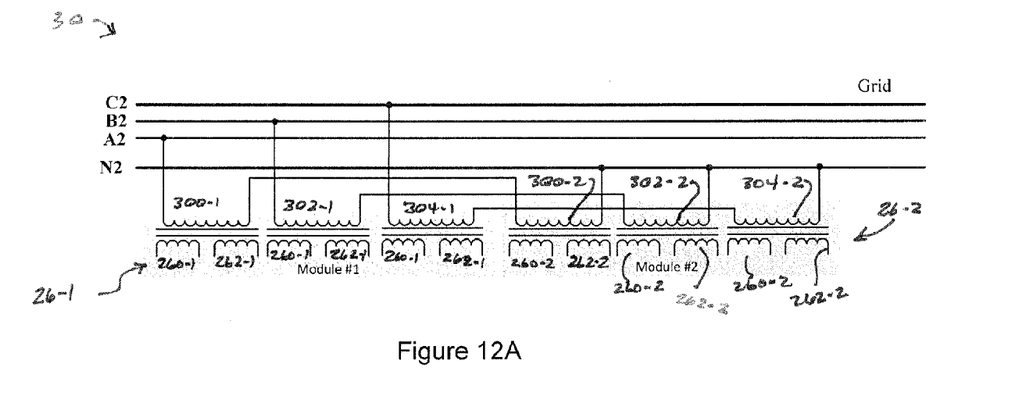
FIG. 12A is a schematic representation of the isolation transformer for a two module inverter in accordance with the topology depicted in FIG. 5.

Referring to FIG. 12A, a schematic representation of the isolation transformer arrangement for a two module inverter 10 in accordance with the topology depicted in FIGS. 5 and 8 is disclosed. Essentially, when more than one module is applied, the secondary side outputs are connected in series. This arrangement is another feature that provides a modular design. While the transformer depicted in FIG. 8 is shown in FIG. 12A, the transformer of FIG. 9 can also be employed herein.

Figure 12B:
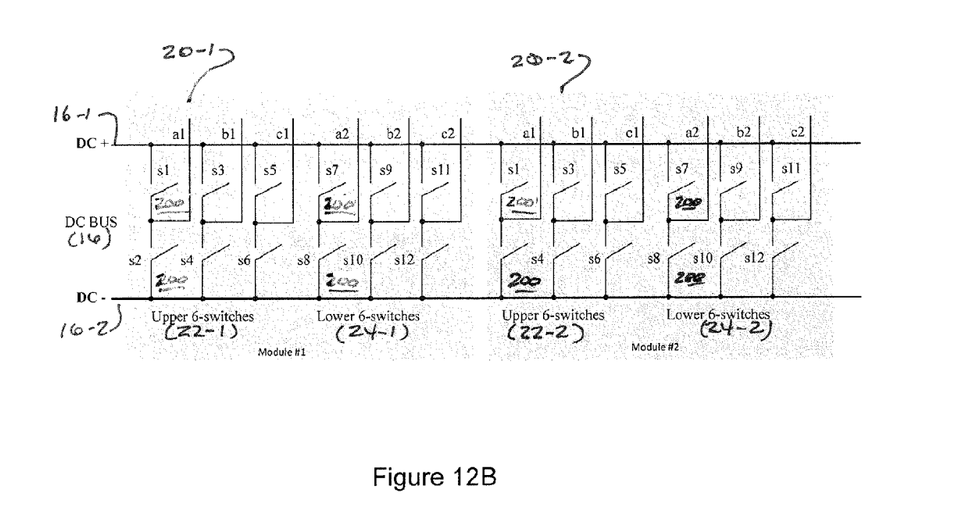
FIG. 12B is a schematic representation of the switches for a two module inverter in accordance with the topology depicted in FIG. 5.

Referring to FIG. 12B, a schematic representation of the switching arrangement in a two module inverter system is disclosed. The modularity of the present invention is exhibited in this view as well. Switch modules 20-1 and 20-2 are merely connected to the DC bus 16. As noted previously, when more than one module is employed, the phase shift angles between the different modules can be calculated according to equation 1. In this example, two modules are used and the drive signals for switches S1-S12 in module 20-1 are actuated 15° (360/24) in advance of the corresponding drive signals for the switches S1-S12 in module 20-2.

When more than one module is used, module 20-1 can be designated as the master module, with the additional modules functioning as slaves since all timing signals are offset relative to the module 20-1 in accordance with equation (1). In one embodiment, the master can transmit the offset data based on the number of modules it detects in the system. Subsequently, a synchronization signal is transmitted to all the slaves at the beginning of each switching period. When all slaves receive the sync signal, they are configured to add the proper offset angles to the sync signal in accordance with equation (1).

Figure 13A:
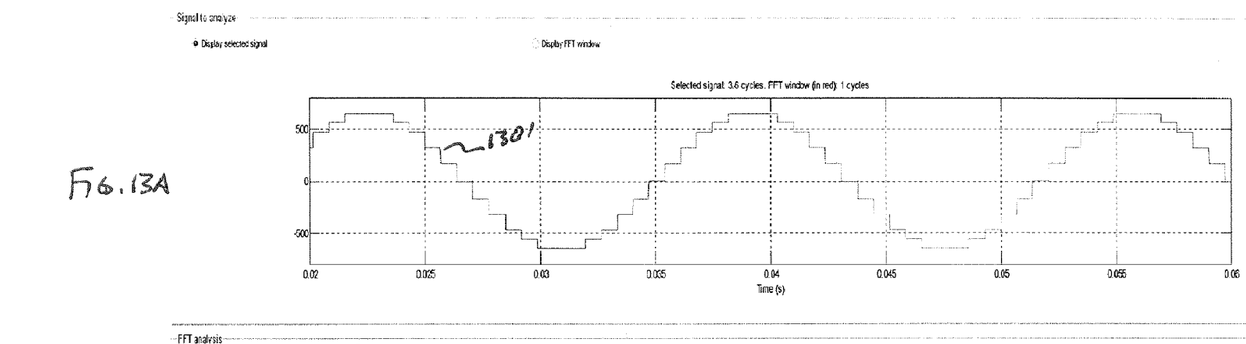
FIG. 13A-13B are plots showing the output voltage and the harmonic spectrum of the output voltage, respectively, at the transformer secondary side in the two module embodiment of the present invention depicted in FIGS. 12A-12B
Figure 13B:
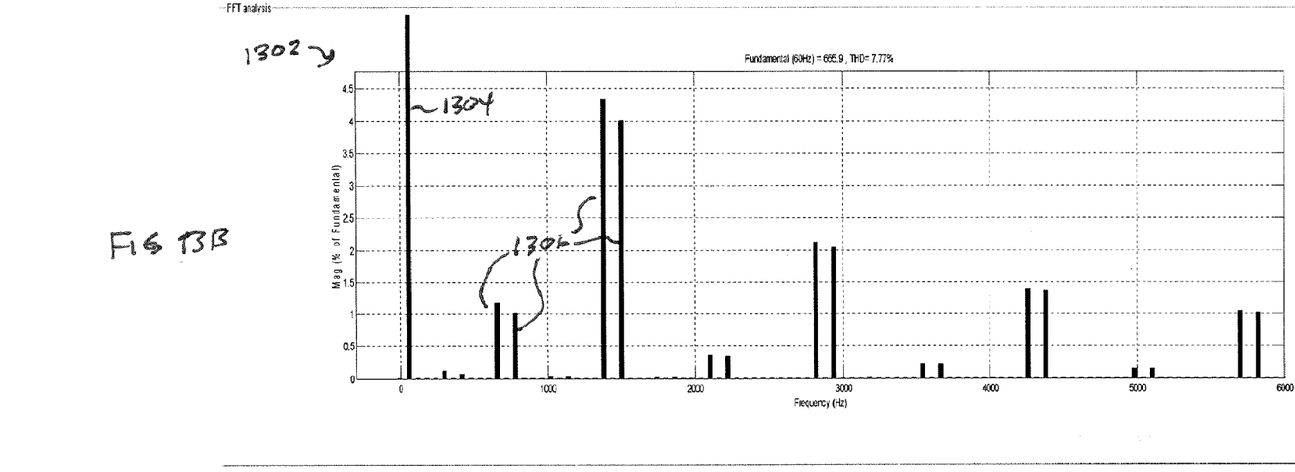

Referring to FIG. 13A-13B, plots showing the output voltage (13A) and the harmonic spectrum of the output voltage (13B), respectively, at the transformer secondary side in the two module embodiment of the present invention depicted in FIGS. 12A-12B are disclosed. FIGS. 12 and 13 are inherently present in the topology shown in FIG. 5.

FIG. 13A provides a waveform 1301 which is a graphical representation of equation 4. When more than one module is applied and each module's transformer has the same scale of $1/\sqrt{3}:1:2$, we can get more steps output at the transformer's secondary side. Because each module's output waveform in the transformer's secondary side has a proper phase shift angle with each other, they can cascade together to generate a multi steps waveform. The fundamental component of the synthesized output voltage at ac grid side is:

$$u(t) = \frac{4\sqrt{3}\,U_{dc}}{\pi}\left(\sum_{i=0}^{N-1}\sin\left(\omega t - \frac{2\pi i}{12N}\right)\right) \quad (10)$$

Where N is the number of modules.

For the transformer, the scale of $n1:n2=1/\sqrt{3}:1$ guarantees that the output voltage at the secondary side can cancel unwanted harmonics, as expressed by equation (2)-(3). If the grid has a certain voltage requirement, the transformer's secondary side turns number n3 can be adjusted to satisfy the AC grid standard. Obviously, the transformer's ratio is affected by the DC bus voltage and number of modules as well. So normally, when any three factors are fixed (e.g., DC bus voltage, number of modules, transformer ratios, or AC grid voltage), the other factor can be calculated by the equations provided herein. The number of modules employed in the design will impact the transformer's parametric design as well as the harmonic voltage cancellations synthesized in the AC grid on the secondary side.

FIG. 13B is a plot showing the harmonic spectrums of the output voltage at the transformer secondary side in a two module embodiment. Spectral tone 1304 corresponds to the line frequency and spectral tones 1306 correspond to the harmonic tones predicted by equation 4. Note that this equation predicts and the plot shows that the 11th and 13th harmonic components can be minimized at the output voltage of transformer's secondary side.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. A system configured to be connected to an AC power grid having at least one AC phase signal, the system comprising:
    at least one controller configured to provide at least one of a plurality of control signals, each control signal being phase shifted with respect to each other control signal of the plurality of control signals;
    a plurality of inverter modules, each inverter module receiving at least one of the plurality of control signals and comprising a first inverter having a plurality of first switch elements coupled to a direct current (DC) voltage and actuated in accordance with the received control signal, the first inverter providing a first voltage signal, each inverter module further comprising a second inverter including a plurality of second switch elements coupled to the DC voltage and actuated in accordance with the received, the second inverter providing a second voltage signal wherein the first voltage signal and the second voltage signal is phase shifted with respect to each other first and second voltage signals produced by each other inverter module of the plurality of inverter modules; and
    at least one transformer module comprising a plurality of primary windings, each primary winding of the plurality of primary windings being respectively coupled to one of the first or second inverters of the plurality of inverter modules, the transformer module further including at least one secondary winding coupled to each winding of the plurality of windings, the at least one second primary winding being coupled to the AC power grid for each at least one AC phase signal, the secondary winding being configured to provide a secondary output voltage to the AC power grid by combining the first voltage signal and the second voltage signal of each inverter module such that predetermined harmonic components of the secondary output voltage are substantially cancelled.

2. The system of claim 1, further comprising at least one energy conversion system configured to derive the DC voltage from a predetermined naturally occurring energy source.

3. The system of claim 2, wherein the at least one energy conversion system includes at least one photovoltaic (PV) string.

4. The system of claim 3, wherein the at least one PV string includes a plurality of PV string assemblies coupled in parallel to a DC bus.

5. The system of claim 4, wherein each of the plurality of PV string assemblies includes a PV string disposed in series with a DC/DC converter.

6. The system of claim 2, wherein the at least one energy conversion system is coupled to a DC bus configured to accommodate a plurality of energy conversion systems in accordance with a predetermined system power rating.

7. The system of claim 1, wherein each control signal of the plurality of control signals is phased shifted with respect to at least one control signal of the plurality control signals, wherein the phase shift is determined by:

$$\theta_{phase\_shift} = \frac{360°}{12m}, m \geq 2$$

Wherein m is the number of modules in the system, m being an integer value.

8. The system of claim 1, wherein a fundamental component of the secondary output voltage synthesized at the AC grid is represented as:

$$u(t) = \frac{4\sqrt{3}\,U_{dc}}{\pi}\left(\sum_{i=0}^{N-1} \sin\!\left(\omega t - \frac{2\pi i}{12N}\right)\right),$$

Wherein N is the number of modules in the system, N being an integer value.

9. The system of claim 1, wherein each of the plurality of first switch elements or each of the plurality of second switch elements are implemented using a solid state switch.

10. The system of claim 9, wherein the solid state switch is selected from a group of switches including an N-channel MOSFET switch, a P-channel MOSFET switch, an IGBT switch or a thyristor switch.

11. The system of claim 1, wherein the at least one AC phase signal includes three AC phase signals, each of the AC phase signals being separated by 120°.

12. The system of claim 11, wherein each first switch element is actuated to provide voltage pulses that are phase delayed or phase advanced with respect to voltage pulses provided by an adjacent first switch element, and wherein each second switch element is actuated to provide a voltage pulse that is phase delayed or phase advanced with respect to another voltage pulse provided by an adjacent second switch element.

13. The system of claim 12, wherein the phase delay or phase advance is substantially equal to 120°.

14. The system of claim 12, wherein the plurality of first switch elements or the plurality of second switch elements includes six switch elements.

15. The system of claim 14, wherein the six switch elements includes a first set of three switch elements and a second set of three switch elements.

16. The system of claim 15, wherein each of the first set of three switch elements is paired with a corresponding one of the second set of three switch elements, the pair being dedicated to one of the three AC phase signals.

17. The system of claim 15, wherein each control signal of the plurality of control signals includes a first set of three control signals configured to drive the first set of three switch elements and a second set of three control signals configured to drive the second set of three switch elements.

18. The system of claim 17, wherein each of the first set of three control signals is 120° out of phase with respect to the other two control signals of the first set of three control signals.

19. The system of claim 17, wherein each of the second set of three control signals is 180° out of phase with a corresponding control signal of the first set of three control signals.

20. The system of claim 1, wherein the first voltage signal is represented as:

$$u_{a1N1}(t) = \frac{2U_{dc}}{\pi}\left(\sin\omega t + \frac{1}{5}\sin5\omega t + \frac{1}{7}\sin7\omega t + \frac{1}{11}\sin11\omega t + \frac{1}{13}\sin13\omega t + \ldots\right)$$

and wherein the second voltage signal is represented as:

$$u_{a2b2}(t) = \frac{2\sqrt{3}\,U_{dc}}{\pi}\left(\sin\omega t - \frac{1}{5}\sin5\omega t - \frac{1}{7}\sin7\omega t + \frac{1}{11}\sin11\omega t + \frac{1}{13}\sin13\omega t + \ldots\right),$$

wherein $U_{dc}$ represents the DC voltage.

21. The system of claim 20, wherein the predetermined harmonic components include at least the fifth and seventh harmonic components.

22. The system of claim 1, wherein each primary winding coupled to one of the first inverters of the plurality of inverter modules and the at least one secondary winding are configured as at least one Y-Y transformer, and wherein each primary winding coupled to one of the second inverters of the plurality of inverter modules and the at least one secondary winding are configured as at least one Δ-Y transformer.

23. The system of claim 22, wherein each primary winding coupled to one of the first inverters of the plurality of inverter modules, each primary winding coupled to one of the second inverters of the plurality of inverter modules, and the at least one secondary winding share a common transformer core.

24. The system of claim 23, wherein each primary winding coupled to one of the first inverters of the plurality of inverter modules and the at least one secondary winding are coupled by a first transformer core, and wherein each primary winding coupled to one of the second inverters of the plurality of inverter modules and the at least one secondary winding are coupled by a second transformer core.

25. The system of claim 22, wherein the at least one AC phase signal includes three AC phase signals, each of the AC phase signals being separated by 120°, and wherein the at least one Y-Y transformer includes three Y-Y transformers and the at least one Δ-Y transformer includes three Δ-Y transformers.

\* \* \* \* \*

UNITED STATES PATENT AND TRADEMARK OFFICE
CERTIFICATE OF CORRECTION

PATENT NO.       : 9,722,427 B2                                          Page 1 of 1
APPLICATION NO.  : 13/979474
DATED            : August 1, 2017
INVENTOR(S)      : Mingyao Ma et al.

It is certified that error appears in the above-identified patent and that said Letters Patent is hereby corrected as shown below:

In the Claims

Column 10, Line 53, Claim 1 after the word received delete "," and add --control signal,--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*